United States Patent
Spalding

(10) Patent No.: US 6,914,036 B2
(45) Date of Patent: Jul. 5, 2005

(54) DEMULSIFIER FOR AQUEOUS COMPLETION FLUIDS

(75) Inventor: William A. Spalding, Missouri City, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/809,529

(22) Filed: Mar. 15, 2001

(65) Prior Publication Data

US 2003/0032683 A1 Feb. 13, 2003

(51) Int. Cl.$^7$ ............................. C09K 7/00; B01D 17/05
(52) U.S. Cl. ..................... 507/136; 507/921; 516/151
(58) Field of Search ..................... 516/151; 507/136, 507/921

(56) References Cited

U.S. PATENT DOCUMENTS

| | | | |
|---|---|---|---|
| 3,682,990 A | 8/1972 | Schoen et al. ............. 516/193 |
| 4,402,857 A | 9/1983 | Rae ............................ 516/189 |
| 4,421,680 A * | 12/1983 | Shivar ........................ 510/365 |
| 4,446,054 A | 5/1984 | Bessler ....................... 516/146 |
| 4,551,239 A | 11/1985 | Merchant et al. .......... 210/708 |
| 4,737,265 A | 4/1988 | Merchant et al. .......... 210/708 |
| 4,968,449 A | 11/1990 | Stephenson ................ 516/189 |
| 5,008,026 A * | 4/1991 | Gardner et al. ............ 507/235 |
| 5,045,212 A | 9/1991 | Augustin et al. ........... 210/708 |
| 5,102,580 A | 4/1992 | Toenjes et al. ............. 516/163 |
| 5,389,156 A * | 2/1995 | Mehta et al. ............... 134/10 |
| 5,543,387 A | 8/1996 | Mokadam et al. .......... 507/135 |
| 5,597,792 A * | 1/1997 | Klier et al. ................. 510/417 |
| 5,602,090 A * | 2/1997 | Melikyan et al. ........... 134/40 |
| 5,643,460 A | 7/1997 | Marble et al. .............. 210/708 |
| 5,730,905 A | 3/1998 | Hart et al. .................. 516/172 |
| 5,762,149 A | 6/1998 | Donovan et al. ........... 175/40 |
| 5,797,456 A | 8/1998 | Mokadam .................. 166/307 |
| 5,863,881 A * | 1/1999 | Vlasblom ................... 510/365 |
| 5,885,424 A | 3/1999 | Davis et al. ................ 210/748 |
| 5,942,469 A * | 8/1999 | Juprasert et al. ........... 507/234 |
| 5,985,816 A * | 11/1999 | Vlasblom ................... 510/365 |

FOREIGN PATENT DOCUMENTS

| | | | |
|---|---|---|---|
| GB | 2 344 349 | | 7/2000 |
| WO | WO-2000/09856 | * | 2/2000 |
| WO | WO 00/13762 | | 3/2000 |
| WO | WO 00/50541 | | 8/2000 |

OTHER PUBLICATIONS

TOMAH Products, Inc., TDS (Technical Data Sheet), http://www.tomah3.com/products/show.asp?ProdID=112, Jun. 19, 2002.*
McCutcheon's vol. 1: Emulsifiers & Detergents North American Edition, 1993 (McCutcheon Division, MC Publishing Co, Glen Rock, NJ) Jan. 1994, pp. v and 3.*

* cited by examiner

*Primary Examiner*—Daniel S. Metzmaier
(74) *Attorney, Agent, or Firm*—Paula D. Morris; The Morris Law Firm, P.C.

(57) ABSTRACT

Methods and compositions effective for preventing or resolving emulsions of oil in aqueous solutions, preferably for preventing or resolving oil-in-water emulsions formed in aqueous brines used as completion fluids or workover fluids.

78 Claims, No Drawings

DEMULSIFIER FOR AQUEOUS COMPLETION FLUIDS

FIELD OF THE INVENTION

The present invention relates to methods and compositions effective for resolving emulsions of oil and water, preferably for resolving water-in-oil emulsions formed in aqueous brines used as completion fluids or workover fluids.

BACKGROUND OF THE INVENTION

Various aqueous fluids are commonly introduced into wellbores in order to perform drilling, completion and workover operations. Such fluids must perform a number of functions, including: (1) providing sufficient hydrostatic pressure to prevent formation fluids from entering the wellbore, (2) cleaning the hole with reasonable pump pressures and annular velocities, (3) preventing excessive fluid [filtrate or whole fluid] losses to the formation, (4) remaining stable at the maximum well temperature, (5) providing maximum protection against formation damage, and (6) having environmentally acceptable properties. Fluids, which meet these requirements typically, are aqueous solutions of one or more soluble salts including potassium chloride, sodium chloride, calcium chloride, sodium bromide, calcium bromide or zinc bromide, having densities up to and beyond 19.2 pounds per gallon.

After aqueous fluids are introduced into a wellbore, the fluids may be exposed to hydrocarbons, particularly those produced from the formation in the pay zone. Contamination of aqueous fluids by such hydrocarbons may lead to the formation of stable water-in-oil emulsions. The emulsions, which often are highly viscous and gel like, may develop emulsion blockages in the producing formation, thus diminishing the capability of the well to produce.

Water-in-oil emulsions can be broken by various physical methods, including heating, centrifugation, electrostatic precipitation and filtration, however none of these physical methods is feasible for use downhole. As a result, chemical additives are needed which effectively prevent or resolve downhole emulsions in aqueous solutions, such as brines, without the need for physical stimulation.

SUMMARY OF THE INVENTION

A composition comprising:
  a demulsifying amount of a demulsifier effective to perform a function selected from the group consisting of demulsifying an emulsion in an aqueous solution and preventing formation of an emulsion in an aqueous solution;
  a first solubilizing quantity of a solubilizing surfactant effective to solubilize said demulsifier in said aqueous solution; and
  a second solubilizing quantity of a mutual organic solvent effective to solubilize said demulsifier and said solubilizing surfactant in said composition.

DETAILED DESCRIPTION OF THE INVENTION

The present invention provides new and useful compositions and blends that are soluble in a wide variety of aqueous solutions, particularly brines, and will prevent or resolve oil-in-water emulsions in those brines.

The blend preferably is used either as an integral component of an aqueous drilling, workover or completion fluid, or is added to the fluid prior to the introduction of the fluid into a wellbore. However, it is preferred for the demulsifier to be added to the fluid with mild agitation before application of the fluid to the well bore. If the blend is present in the aqueous fluid before contact with a hydrocarbon, the solubilized or dispersed demulsifying agent interferes with the formation of an emulsion, causing the hydrocarbons to form a separate phase that can be circulated away with the aqueous fluid. If added after an emulsion has formed, the preferred demulsifier is added to the fluid after emulsification is detected. Clearly it is preferred to add the demulsifier before any emulsion forms.—the solubilized or dispersed demulsifying agent resolves the oil-in-water emulsion, separating the hydrocarbon molecules from the aqueous fluid and allowing the separate hydrocarbon phase to be circulated away with the aqueous phase.

The demulsifying composition comprises a blend comprising at least: a "demulsifying amount" of a demulsifier, preferably an "ionic surfactant"; a "first solubilizing quantity" of a solubilizing surfactant for the demulsifier, preferably of a non-ionic surfactant; and a "second solubilizing quantity" of a mutual organic solvent. The blend is soluble in a diverse range of aqueous drilling, workover and completion fluids, preferably at both ambient and elevated temperatures. The solubility of the blend is sufficient to ensure a uniform distribution of the blend within the fluid and subsequent transportation downhole to any point where water-hydrocarbon emulsions may form. The solubility of the blend also is sufficient to allow for convenient addition to and mixing with the drilling, workover or completion fluid using standard oil field equipment. The blend preferably remains soluble even at high temperatures in order to avoid potential damage to the permeable formation due to precipitation of the solubilizing surfactants.

The blend comprises a "demulsifying amount" of a demulsifier, preferably an ionic surfactant. The demulsifier serves to either prevent or to break up emulsions in an aqueous fluid, preferably a brine. A "demulsifying amount" is an amount effective to demulsify hydrocarbon emulsions found in the particular fluid. The amount required to demulsify hydrocarbons in a given formation will vary with the fluid and/or formation being treated and with the amount of hydrocarbons that are expected to mix with the aqueous fluid. Suitable demulsifying amounts typically are from about 1.0 wt. % to about 40.0 wt. % of the blend, preferably from about 2 to about 10 wt. % of the blend; more preferably, about 5%;

Typical demulsifiers for breaking crude oil emulsions which may have utility in the compositions herein are described in U.S. Pat. Nos. 2,499,370; 2,557,081; 2,602,053; 3,640,894; 3,699,894; 3,684,735; 4,537,701; and U.K. Patent No. 2,118,937A, all of which are incorporated herein by reference. Suitable "ionic surfactants" are defined herein to include, but are not necessarily limited to, oxyalkylated alkyl phenol resins, oxyalkylated amines, glycol resin esters, bisphenol glycol ethers, bisphenol glycol esters, salts of alkylaryl sulfonic acid, dicarbamates, oxyalkylated polyols reacted with compounds selected from the group consisting of diepoxides and polycarboxylic acids, unreacted oxyalkylated polyols, unreacted oxyalkylated phenolic resins, and combinations thereof. Which demulsifier or solubilizing surfactant to use, as well as whether to use a single demulsifier or a combination of demulsifiers, will depend upon the drilling system, preferably the completion brine, and the formation at issue.

In a preferred embodiment, the demulsifier is a salt of a sulfonic acid, preferably an amine salt of a sulfonic acid, more preferably a salt of an alkyl aryl sulfonic acid, and most preferably a salt of sulfonic acid having the following general formula:

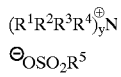

wherein $R^1$, $R^2$, $R^3$, and $R^4$ independently are selected from the group consisting of hydrogen and straight chain or branched alkyl groups having from about 1 to about 20 carbon atoms, and heterogeneous and substituted forms thereof comprising one or more atoms selected from the group consisting of oxygen, sulfur, and nitrogen; and $R^5$ is selected from the group consisting of alkyl groups, aryl groups, aralkyl groups and alkaryl groups wherein the alkyl portions of any of these groups has from about 1 to about 20 carbon atoms.

In a preferred embodiment, $R^1$, $R^2$ and $R^3$ are hydrogen atoms; $R^4$ is an isopropyl group; $R^5$ is a dodecylphenyl group, representing a 2-propanamine salt of dodecyl benzene sulfonic acid. Compositions falling within the foregoing structure are available from a variety of commercial sources, and are made using techniques generally known to persons of ordinary skill in the art. Dodecyl benzene sulfonic acid is available from a variety of commercial sources, including but not necessarily limited to Albright & Wilson Americas, Ashland Chemical Co., Industrial Chemicals and Solvents Div., BIT Mfg., Inc. and Browning Chemical Corp.

The salt of sulfonic acid is formed by reacting the selected amine with the selected sulfonic acid. For example, in order to make a 2-propanamine salt of dodecyl benzene sulfonic acid, 2-propanamine is added slowly to dodecylbenzene sulfonic acid in a suitable solvent that will not limit the solubility of the 2-propanamine in an aqueous system. Examples of such solvents include, but are not necessarily limited to all water soluble glycol ethers, including ethylene glycol mono-butyl ether and dipropylene glycol mono-methyl ether; water soluble amides including but not necessarily limited to N,N-dimethylformamide, N,N-dimethylacetamide, 1-methyl-2-pyrrolidinone and water soluble alcohols, including but not necessarily limited to methanol, ethanol, 1-propanol and 2-propanol. A preferred alcoholic solvent is 2-propanol. The 2-propanamine is added to the solvent with stirring. The temperature of the reaction preferably is maintained at about 20° C. or below.

The solubilizing surfactant solubilizes the demulsifier in a typical aqueous drilling, workover or completion fluid. The "first solubilizing quantity" of the "solubilizing surfactant" in the blend is a quantity effective to solubilize the demulsifier, preferably an ionic surfactant, in the aqueous fluid being treated, preferably a brine, most preferably a completion or workover fluid. The first solubilizing quantity is not necessarily the quantity that would be required to solubilize the demulsifier, alone, in the aqueous fluid. The presence of other components in the blend may alter the quantity that otherwise would be required to solubilize the demulsifier. Suitable "first solubilizing quantities" typically are from about 1 to about 80 wt. %, preferably, from about 1.0 to about 10.0 wt % of the blend. Preferably, the non-ionic surfactant is selected so that it does not cause excessive emulsification of the hydrocarbons into the aqueous drilling, workover, or completion fluid. Suitable non-ionic surfactants have a hydrophilic-lipophilic balance (HLB) value of from about 5 to about 20, preferably from about 8 to about 15.

Examples of suitable solubilizing surfactants include, but are not necessarily limited to polyoxyalcohols, tall oil ethoxyethylate having from about 6 to about 15 moles of ethylene oxide, ethoxylated nonylphenols, phosphated fatty alcohol ethoxylates such as phosphated oleyl or tridecyl ether having from about 2 to about 10 moles of ethoxylation.

Preferred solubilizing surfactants are non-ionic surfactants, preferably alkoxylated compounds having the following general formula:

wherein $R^6$ independently is selected from aryl groups, acyl groups and alkyl groups having from about 1 to about 22 carbon atoms, preferably from about 8 to about 16 carbon atoms, said acyl groups having the following general formula:

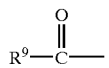

wherein $R^9$ is an alkyl group having from about 1 to about 24 carbon atoms, preferably from about 1 to about 20 carbon atoms, more preferably from about 4 to about 16 carbon atoms;

$R^7$ independently is selected from the group consisting of hydrogen and alkyl groups having from about 1 to about 6 carbon atoms.

$R^8$ is selected from the group consisting of hydrogen, aryl groups and alkyl groups having from about 1 to about 6 carbon atoms; preferably from 0 to 2, most preferably, H; and x is from about 1 to about 30, preferably from about 2 to about 20, most preferably from about 5 to about 10.

Suitable commercially available non-ionic surfactants include, but are not necessarily limited to: PLURADYNE TDA 6™, made from tridecyl ($C_{10}$) alcohol plus 6 mols of ethylene oxide, available from BASF Corporation; ALFONIC 14/12 9™, made from $C_{12}$–$C_{14}$ alcohols and 9 mols of ethylene oxide, available from Condea Vista. A most preferred non-ionic surfactant is an alcohol ethoxylate comprising a $C_{14}$–$C_{15}$ linear alcohol with from about 5 to about 10 moles, preferably 7 moles of ethylene oxide added. This non-ionic surfactant is commercially available from TOMAH Reserve, Inc.

The non-ionic surfactant may be made using methods known in the art. For example, solubilizing surfactants represented by the formula $C_{14-15}H_{29-31}O(CH_2CH_2O)_7H$ may be made by charging a reactor with 1 mol of a mixture of $C_{14-15}$ linear alcohols dissolved in an azeotropic solvent, preferably xylenes. The water (matrix water plus water of reaction) is stripped by heating the reactor contents to reflux in the presence of a catalytic amount of a suitable base, which is sufficiently strong to catalyze ethoxylation, preferably potassium hydroxide. The water will azeotrope overhead with xylene. After all the water has distilled, the contents are cooled and transferred to a pressure reactor. After heating to about 90° C., stoichiometric ethylene oxide is slowly added under nitrogen pressure over a 2 hour period. When the increased vapor pressure falls down to the pressure of nitrogen only due the consumption of ethylene oxide, the reaction is complete. The base preferably is neutralized using an equivalent amount of an organic acid, preferably acetic acid, and the xylenes are distilled from the product.

In addition to the ionic surfactant and the non-ionic surfactant, the composition comprises a "second solubilizing quantity" of a mutual organic solvent. This "second solubilizing quantity" is a quantity that is effective to solubilize both the ionic surfactant and the non-ionic surfactant and preferably to assist in resolution of the emulsion by allowing the demulsifier to penetrate the emulsion. The second solubilizing quantity of mutual organic solvent preferably is from about 40 to about 95 wt. %, more preferably from about 65 to about 95 wt. % of the blend. Suitable mutual organic solvents include, but are not necessarily limited to water soluble glycol ethers, including but not necessarily limited to ethylene glycol mono-butyl ether, dipropylene glycol mono-methyl ether and other water soluble propylene glycol ethers. Other suitable mutual organic solvents include, but are not necessarily limited to water soluble amides including but not necessarily limited to N,N-dimethylformamide, N,N-dimethylacetamide, 1-methyl-2-pyrrolidinone; water soluble ketones, including but not necessarily limited to acetone and water soluble alcohols, including but not necessarily limited to methanol, ethanol, 1-propanol and 2-propanol.

Preferred mutual organic solvents are water soluble alkanol ethers having the formula $$R^{10}O(CH_2CHR^{11}O)_zR^{12}$$

wherein $R^{10}$, $R^{11}$ and $R^{12}$ independently are selected from the group consisting of hydrogen and alkyl groups having from about 1 to about 6 carbon atoms, preferably from 1 to about 4 carbon atoms; and z is from about 1 to about 22, preferably from about 1 to about 8.

In a more preferred embodiment, the mutual organic solvent is a glycol ether wherein $R^{10}$ is hydrogen, $R^{11}$ is hydrogen, $R^{12}$ is selected from the group consisting of methyl, ethyl, propyl, iso-propyl, and butyl groups, and x is 1. Even more preferred is ethylene glycol monobutyl ether (EGMBE), and most preferred is ethylene glycol monomethyl ether (EGMME). Such solvents are available from a variety of commercial sources. For example, both EGMBE and EGMME are available from: Ashland Chemical Company, Inc. (Industrial Chemicals and Solvents Div.); Brown Chemical Co., Inc. (Chemcentral Corp); Occidental Chemical Corp (Basic Chemicals Group); Union Carbide Corporation; Van Waters & Rogers, Inc., and others. The desired alkylene glycol alkyl ethers also may be made using known reactions. For example, about 1 mol of a salt of the alcohol of the desired alkyl group (preferably the sodium salt) may be reacted with about 1 mol of the desired alkylene oxide group. In order to make MGBE, 1 mol of the sodium salt of n-butanol is reacted with 1 mol of ethylene oxide using excess n-butanol as a solvent.

A most preferred demulsifier blend comprises from about 85 to about 95 wt. % ethylene glycol monomethyl ether, from about 2.5 to about 7.5 wt. % of the 2-propanamine salt of dodecyl benzene sulfonic acid, and from about 1.0 to about 7.5 wt. % of an alcohol ethoxylate comprising a $C_{14}$ to $C_{15}$ linear alcohol with 7 moles of ethylene oxide.

In general, the blend comprises a ratio of components such that the resulting blend is soluble in a diverse range of completion brines at concentrations of from about 0.1 vol. % to about 10 vol. %, preferably from about 0.25 vol. % to about 2 vol. %. By "soluble" is meant that, upon addition of the blend to the completion brine, the brine becomes clear to the sight and no visible precipitate forms on standing for 3 days. The final concentration of the blend in the completion fluid will depend upon the composition of the completion fluid and the composition of the hydrocarbons encountered. In general, the concentration and the time required for resolution of an emulsion tend to increase with brine density. The concentration also may vary depending upon the temperatures to which the fluid will be exposed, the required concentration generally decreasing as the temperatures increases. Over-treatment may result in a reduction of emulsion resolution efficiency.

A suitable final concentration preferably is determined prior to application through the following simple test procedure. In order to assess the effectiveness of candidate demulsifier blends, the demulsification properties are assessed as follows:

1) The candidate formulation is added to previously prepared completion brines at an appropriate concentration at ambient temperature;

2) The brine/blend mixture is added into a clean and dry graduated centrifuge tube;

3) A sample of the produced fluids (crude oil) that is representative of that likely to be encountered by the brine during the completion process is carefully added to the centrifuge tube;

4) Without purposely mixing the two separate phases, the tube is capped and placed into an oil bath that has been preheated to a temperature representative of those likely to be encountered in the field;

5) The centrifuge tube is left undisturbed in the oil bath until the contents have reached the bath temperature (for repeatability purposes the tubes are left in the bath for the same duration for each test);

6) The centrifuge tube is carefully removed from the bath and vigorously shaken for exactly 60 seconds;

7) The centrifuge tube is immediately returned to the bath and a timer is initiated;

8) The contents of the centrifuge tube is inspected 5 minutes, 15 minutes, 30 minutes, and 60 minutes after mixing, noting the quantity of completion brine that has resolved from the produced emulsion. Any observations regarding aspects, such as the clarity of the resolved brine and the appearance of any interface is noted.

Preferred formulations, when added at a concentration of from about 0.25% to about 3% v./v., preferably from about 1.0% to about 3% v.v., resolve an emulsion comprising a solution of 50 vol. % brine (with additive) and 50 vol. % produced fluid (from the field) within about 60 minutes, preferably about 30 minutes, more preferably about 15 minutes, most preferably about 5 minutes. A mixture is "resolved" when two separate phases form—an aqueous phase and an organic phase. In a preferred embodiment, at least 90 vol. %, preferably 95 vol. % or more, more preferably about 99 vol. % or more, and most preferably 100 vol. % of the original aqueous fraction is recovered as a "water drop."

The invention will be better understood with reference to the following examples, which are illustrative only, and not intended to limit the invention to any particular embodiment.

EXAMPLE 1

In order to assess the solubility of a potential demulsifier blend, the blend was added to a range of prepared completion brines at a variety of concentrations. The solubility of the material was visually assessed both on initial addition of the blend to the brine, and after exposing the brine/formulation mixture to a temperature of 150° F. (65.56° C.)

for 30 minutes. The blend used in the following experiments ("Formulation 1") was 92.50 w./w. water soluble glycol ether; 2.50 w./w. ethoxylated fatty acid; and, 5.00 w/w amine salt of alkyl aryl sulfonic acid.

Formulation 1 was added to the listed brines at a concentration of 0.50 % v./v., and the following results were seen:

| Brine Composition | Solubility at Ambient Temperature | Solubility at 150° F./ 30 minutes |
|---|---|---|
| Synthetic Sea Water | Very Slight Haze | Very Slight Haze |
| 11.6 lb./gallon calcium chloride | Completely Soluble | Completely Soluble |
| 14.2 lb./gallon calcium bromide | Completely Soluble | Completely Soluble |
| 15.1 lb./gallon calcium chloride/bromide mix | Very Slight Haze | Completely Soluble |
| 15.7 lb./gallon zinc bromide | Completely Soluble | Completely Soluble |
| 19.2 lb./gallon zinc bromide | Completely Soluble | Completely Soluble |

Formulation 1 was added to the listed brines at a concentration of 1.00% v./v., and the following results were seen:

| Brine Composition | Solubility at Ambient Temperature | Solubility at 150° F./ 30 minutes |
|---|---|---|
| Synthetic Sea Water | Very Slight Haze | Very Slight Haze |
| 11.6 lb./gallon calcium chloride | Very Slight Haze | Completely Soluble |
| 14.2 lb./gallon calcium bromide | Completely Soluble | Completely Soluble |
| 15.1 lb./gallon calcium chloride/bromide mix | Very Slight Haze | Completely Soluble |
| 15.7 lb./gallon zinc bromide | Completely Soluble | Completely Soluble |
| 19.2 lb./gallon zinc bromide | Completely Soluble | Completely Soluble |

Formulation 1 was added to the listed brines at a concentration of 2.00% v./v., and the following results were seen:

| Brine Composition | Solubility at Ambient Temperature | Solubility at 150° F./ 30 minutes |
|---|---|---|
| Synthetic Sea Water | Very Slight Haze | Very Slight Haze |
| 11.6 lb./gallon calcium chloride | Very Slight Haze | Completely Soluble |
| 14.2 lb./gallon calcium bromide | Completely Soluble | Completely Soluble |
| 15.1 lb./gallon calcium chloride/bromide mix | Very Slight Haze | Completely Soluble |
| 15.7 lb./gallon zinc bromide | Completely Soluble | Completely Soluble |
| 19.2 lb./gallon zinc bromide | Completely Soluble | Completely Soluble |

EXAMPLE II

In order to assess the effectiveness of Formulation 1, the demulsification properties were assessed as follows:

1) The candidate formulation was added to previously prepared completion brines at an appropriate concentration at ambient temperature;

2) The brine/blend mixture was added into a clean and dry graduated centrifuge tube;

3) A sample of produced fluids (crude oil) was carefully added to the centrifuge tube;

4) Without purposely mixing the two separate phases, the tube was capped and placed into an oil bath that had been preheated to a temperature of 150° F. (65.56° C.);

5) The centrifuge tube was left undisturbed in the oil bath until the contents reached the bath temperature (for repeatability purposes the tubes were left in the bath for the same duration for each test);

6) The centrifuge tube was carefully removed from the bath and vigorously shaken for exactly 60 seconds;

7) The centrifuge tube was immediately returned to the bath and a timer was initiated;

8) The contents of the centrifuge tube was inspected 5 minutes, 15 minutes, 30 minutes, and 60 minutes after mixing, noting the quantity of completion brine that had resolved from the produced emulsion. Any observations regarding aspects, such as the clarity of the resolved brine and the appearance of any interface was noted.

The fluids used in the following examples had the following composition:

50.0 v/v. Completion Brine (with additive)

50.0% v/v. Produced Fluids (ex Field Location)

The following results were observed.

| Additive | Brine | Additive Concentration (% v/v) | Water Drop, % v/v | | | |
|---|---|---|---|---|---|---|
| | | | 5 min | 15 min | 30 min | 60 min |
| None | 11.6 lb/gallon calcium chloride | 0.00 | 6.0 | 23.0 | 40.0 | 48.0 |
| Formulation 1 | 11.6 lb/gallon calcium chloride | 1.00 | 45.0 | 50.0 | 50.0 | 50.0 |
| None | 14.2 lb/gallon calcium bromide | 0.00 | 9.0 | 20.0 | 30.0 | 32.0 |

-continued

| Additive | Brine | Additive Concentration (% v/v) | Water Drop, % v/v | | | |
|---|---|---|---|---|---|---|
| | | | 5 min | 15 min | 30 min | 60 min |
| Formulation 1 | 14.2 lb/gallon calcium chloride | 0.25 | 50.0 | 50.0 | 50.0 | 50.0 |
| Formulation 1 | 14.2 lb/gallon calcium chloride | 0.50 | 50.0 | 50.0 | 50.0 | 50.0 |
| Formulation 1 | 14.2 lb/gallon calcium chloride | 1.00 | 48.0 | 50.0 | 50.0 | 50.0 |
| Formulation 1 | 14.2 lb/gallon calcium chloride | 1.50 | 50.0 | 50.0 | 50.0 | 50.0 |
| Formulation 1 | 14.2 lb/gallon calcium chloride | 3.00 | 50.0 | 50.0 | 50.0 | 50.0 |
| None | 15.1 lb/gallon calcium Cl/Br blend | 0.00 | 3.0 | 4.0 | 7.0 | 11.0 |
| Formulation 1 | 15.1 lb/gallon Cl/Br blend | 0.25 | 15.0 | 42.0 | 50.0 | 50.0 |
| Formulation 1 | 15.1 lb/gallon Cl/Br blend | 0.50 | 35.0 | 50.0 | 50.0 | 50.0 |
| Formulation 1 | 15.1 lb/gallon Cl/Br blend | 1.00 | 50.0 | 50.0 | 50.0 | 50.0 |
| Formulation 1 | 15.1 lb/gallon Cl/Br blend | 1.50 | 50.0 | 50.0 | 50.0 | 50.0 |
| Formulation 1 | 15.1 lb/gallon Cl/Br blend | 3.00 | 50.0 | 50.0 | 50.0 | 50.0 |
| None | 15.7 lb/gallon zinc bromide | 0.00 | 2.0 | 4.0 | 9.0 | 25.0 |
| Formulation 1 | 15.7 lb/gallon zinc bromide | 1.00 | 48.0 | 50.0 | 50.0 | 50.0 |
| None | 19.2 lb/gallon zinc bromide | 0.00 | 2.0 | 2.0 | 2.0 | 2.0 |
| Formulation 1 | 19.2 lb/gallon zinc bromide | 0.25 | 1.0 | 1.0 | 1.0 | 1.0 |
| Formulation 1 | 19.2 lb/gallon zinc bromide | 0.50 | 1.0 | 1.0 | 1.0 | 1.0 |
| Formulation 1 | 19.2 lb/gallon zinc bromide | 1.00 | 2.0 | 25.0 | 50.0 | 50.0 |
| Formulation 1 | 19.2 lb/gallon zinc bromide | 1.50 | 1.0 | 35.0 | 50.0 | 50.0 |
| Formulation 1 | 19.2 lb/gallon zinc bromide | 3.00 | 4.0 | 50.0 | 50.0 | 50.0 |

Formulation 1 was effective to resolve emulsions in a wide variety of brines within at least 30 minutes. It appears that brines having a higher density may require slightly longer resolution time.

Many modifications may be made to the present invention without departing from the spirit and scope of the present invention. The embodiment described herein is meant to be illustrative only and should not be taken as limiting the invention, which is defined in the following claims.

I claim:

1. A demulsifier composition to prevent or resolve downhole emulsions in aqueous solutions, said demulsifier composition consisting essentially of:
a demulsifying amount of one or more salts of alkylaryl sulfonic acid effective to perform a function selected from the group consisting of demulsifying an emulsion in an aqueous solution and preventing formation of an emulsion in an aqueous solution;
a first solubilizing quantity of a non-ionic surfactant effective to solubilize said demulsifier in said aqueous solution, said non-ionic surfactant consisting essentially of an alkoxylated compound having the following general formula:

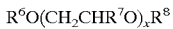

wherein
$R^6$ is an alkyl group having from about 8 to about 16 carbon atoms;
$R^7$ independently is selected from the group consisting of hydrogen and alkyl groups having from about 1 to about 6 carbon atoms;
$R^8$ is selected from the group consisting of hydrogen and alkyl groups having from about 1 to about 6 carbon atoms;
x is from about 2 to about 20; and
a second solubilizing quantity of a mutual organic solvent selected from the group consisting of water soluble glycol ethers, water soluble amides, water soluble ketones, and water soluble alcohols selected from the group consisting of methanol, ethanol, 1-propanol, and 2-propanol, said mutual organic solvent being effective to solubilize said demulsifier and said non-ionic surfactant to produce said demulsifier composition.

2. The composition of claim 1 wherein said aqueous solution is a brine.

3. The composition of claim 2 wherein
said demulsifying amount of said demulsifier is from about 1 wt. % to about 40 wt. %;
said first solubilizing quantity of said non-ionic surfactant is from about 1 wt. % to about 10 wt. %; and
said second solubilizing quantity of said mutual organic solvent is from about 60 to about 98 wt. %.

4. The composition of claim 2 wherein
said demulsifying amount of said demulsifier is from about 2 wt. % to about 10 wt. %; and
said second solubilizing quantity of said mutual organic solvent is from about 85 to about 95 wt. %.

5. The composition of claim 1 wherein
said demulsifying amount of said demulsifier is from about 1 wt. % to about 40 wt. %;
said first solubilizing quantity of said non-ionic surfactant is from about 1 wt. % to about 10 wt. %; and
said second solubilizing quantity of said mutual organic solvent is from about 60 to about 98 wt. %.

6. The composition of claim 1 wherein
said demulsifying amount of said demulsifier is from about 2 wt. % to about 10 wt. %; and
said second solubilizing quantity of said mutual organic solvent is from about 85 to about 95 wt. %.

7. The demulsifier composition of claim 1 wherein said mutual organic solvent is selected from the group consisting of water soluble propylene glycol ethers, N,N-dimethylformamide, N,N-dimethylacetamide, 1-methyl-2-pyrrolidinone, acetone, methanol, ethanol, 1-propanol and 2-propanol.

8. A demulsifier composition to prevent or resolve downhole emulsions in aqueous solutions, said demulsifier composition consisting essentially of:
a demulsifying amount of an amine salt of alkylaryl sulfonic acid effective to perform a function selected from the group consisting of demulsifying an emulsion in an aqueous solution and preventing formation of an emulsion in an aqueous solution;
a first solubilizing quantity of a non-ionic surfactant effective to solubilize said demulsifier in said aqueous solution, said non-ionic surfactant consisting essentially of an alkoxylated compound having the following general formula:

$$R^6O(CH_2CHR^7O)_xR^8$$

wherein
$R^6$ is an alkyl group baying from about 8 to about 16 carbon atoms;
$R^7$ independently is selected from the group consisting of hydrogen and alkyl groups having from about 1 to about 6 carbon atoms;
$R^8$ is selected from the group consisting of hydrogen and alkyl groups having from about 1 to about 6 carbon atoms;
x is from about 2 to about 20; and
a second solubilizing quantity of a mutual organic solvent selected from the group consisting of water soluble glycol ethers, water soluble amides, water soluble ketones, and water soluble alcohols selected from the group consisting of methanol, ethanol, 1-propanol, and 2-propanol, said mutual organic solvent being effective to solubilize said demulsifier and said non-ionic surfactant to produce said demulsifier composition.

9. A demulsifier composition consisting essentially at
a demulsifying amount of one or more salts of alkaryl sulfonic acid effective to perform a function selected from the group consisting of demulsifying an emulsion in an aqueous solution and preventing formation of an emulsion in an aqueous solution;
a first solubilizing quantity of an alkoxylated compound effective to solubilize said demulsifier in said aqueous solution, said alkoxylated compound having the following general formula:

$$R^6O(CH_2CHR^7O)_xR^8$$

wherein
$R^6$ is an alkyl group having from about 8 to about 16 carbon atoms;
$R^7$ independently is selected from the group consisting of hydrogen and alkyl groups having from about 1 to about 6 carbon atoms;
$R^8$ is selected from the group consisting of hydrogen and alkyl groups having from about 1 to about 6 carbon atoms;
x is from about 2 to about 20; and
a second solubilizing quantity of one or more water-soluble alkanol ethers having the formula $$R^{10}O(CH_2CHR^{11}O)_zR^{12}$$

wherein
$R^{10}$, $R^{11}$ and $R^{12}$ independently are selected from the group consisting of hydrogen and alkyl groups having from about 1 to about 6 carbon atoms; and
z is from about 1 to about 22.

10. The composition of claim 9 wherein
$R^{10}$ and $R^{11}$ are hydrogen;
$R^{12}$ is selected from the group consisting of methyl, ethyl, propyl, iso-propyl, and butyl groups;
z is from about 1 to about 8.

11. The composition of claim 10 wherein
said demulsifying amount of said demulsifier is from about 1 wt. % to about 40 wt. %;
said first solubilizing quantity of said alkoxylated compound is from about 1 wt. % to about 10 wt. %; and
said second solubilizing quantity of said one or more water-soluble alkanol ethers is from about 60 to about 98 wt. %.

12. The composition of claim 10 wherein
said demulsifying amount of said demulsifier is from about 2 wt. % to about 10 wt. %; and
said second solubilizing quantity of said one or more water-soluble alkanol ethers is from about 85 wt. % to about 95 w. %.

13. The composition of claim 9 wherein said one or more water-soluble alkanol ethers is selected from the group consisting of ethylene glycol monobutyl ether (EGMBE) and ethylene glycol monomethyl ether (EGMME).

14. The composition of claim 13 wherein
said demulsifying amount of said demulsifier is from about 1 wt. % to about 40 wt. %;
said first solubilizing quantity of said alkoxylated compound is from about 1 wt. % to about 10 wt. %; and
said second solubilizing quantity of said one or more water-soluble alkanol ethers is from about 60 to about 98 wt. %.

15. The composition of claim 13 wherein
said demulsifying amount of said demulsifier is from about 2 wt. % to about 10 wt. %; and
said second solubilizing quantity of said one or more water-soluble alkanol ethers is from about 85 to about 95 wt. %.

16. The composition of claim 9 wherein said demulsifier is a 2-propanamine salt of dodecyl benzene sulfonic acid.

17. The composition of claim 9 wherein said alkoxylated compound has a hydrophilic-lipophilic balance (HLB) value of from about 5 to about 20.

18. The composition of claim 9 wherein said alkoxylated compound has a HLB value of about 8 to about 15.

19. The composition of claim 9 wherein
said demulsifying amount of said demulsifier is from about 1 wt. % to about 40 wt. %;
said first solubilizing quantity of said alkoxylated compound is from about 1 wt. % to about 10 wt. %; and
said second solubilizing quantity of said one or more water-soluble alkanol ethers is from about 60 to about 98 wt. %.

20. The composition of claim 9 wherein
said demulsifying amount of said demulsifier is from about 2 wt. % to about 10 wt. %; and
said second solubilizing quantity of said one or more water-soluble alkanol ethers is from about 85 to about 95 wt. %.

21. A demulsifier composition to prevent or resolve downhole emulsions in aqueous solutions, said demulsifier composition consisting essentially of:
a demulsifying amount of a 2-propanamine salt of dodecyl benzene sulfonic acid effective to perform a function selected from the group consisting of demulsifying an emulsion in an aqueous solution and preventing formation of an emulsion in an aqueous solution;
a first solubilizing quantity of an alcohol ethoxylate having the following general formula $R^6O(CH_2CHR^7O)_xR^8$ wherein
$R^6$ is an alkyl group having from about 8 to about 16 carbon atoms;
$R^7$ independently is selected from the group consisting of hydrogen and alkyl groups having from about 1 to about 6 carbon atoms;
$R^8$ is selected from the group consisting of hydrogen and alkyl groups having from about 1 to about 6 carbon atoms;
x is from about 2 to about 20; and
a second solubilizing quantity of a mutual organic solvent selected from the group consisting of ethylene glycol monobutyl ether (EGMBE) and ethylene glycol monomethyl ether (EGMME).

22. The composition of claim 21 wherein
$R^6$ is a linear alkyl group having from about 14 to about 15 carbon atoms; and
x is from about 5 to about 10.

23. The composition of claim 22 wherein said aqueous solution is a brine.

24. The composition of claim 22 wherein
said demulsifying amount of said 2-propanamine salt of dodecyl benzene sulfonic acid is from about 1 wt. % to about 40 wt. %;
said first solubilizing quantity of said alcohol ethoxylate is from about 1 wt. % to about 10 wt. %; and
said second solubilizing quantity of said mutual organic solvent is from about 60 wt. % to about 98 wt. %.

25. The composition of claim 22 wherein
said demulsifying amount of said 2-propanamine salt of dodecyl benzene sulfonic acid is from about 2 wt. % to about 10 wt. %; and
said second solubilizing quantity of said mutual organic solvent is from about 85 wt. % to about 95 wt. %.

26. The composition of claim 21 wherein said aqueous solution is a brine.

27. The composition of claim 21 wherein
said demulsifying amount of said 2-propanamine salt of dodecyl benzene sulfonic acid is from about 1 wt. % to about 40 wt. %;
said fist solubilizing quantity of said alcohol ethoxylate is from about 1 wt. % to about 10 wt. %; and
said second solubilizing quantity of said mutual organic solvent is from about 60 wt. % to about 98 wt. %.

28. The composition of claim 21 wherein
said demulsifying amount of said 2-propanamine salt of dodecyl benzene sulfonic acid is from about 2 wt. % to about 10 wt. %; and
said second solubilizing quantity of said mutual organic solvent is from about 85 wt. % to about 95 wt. %.

29. A demulsifier composition to prevent or resolve downhole emulsions in aqueous solutions, said demulsifier composition consisting essentially of:
a demulsifying amount of one or more salts of alkylaryl sulfonic acid, effective to perform a function selected from the group consisting of demulsifying an emulsion in an aqueous solution and preventing formation of an emulsion in an aqueous solution;
a first solubilizing quantity of a non-ionic surfactant selected from the group consisting of polyoxyalcohols, tall oil ethoxyethylate hiving from about 6 to about 15 moles of ethylene oxide, ethoxylated nonylphenols, and phosphated fatty alcohol ethoxylates having from about 2 to about 10 moles of ethoxylation; and
a second solubilizing quantity of a mutual organic solvent selected from the group consisting of water soluble glycol ethers, water soluble amides, water soluble ketones, and water soluble alcohols selected from the group consisting of methanol, ethanol, 1-propanol, and 2-propanol, said mutual organic solvent being effective to solubilize said demulsifier and said non-ionic surfactant to produce said demulsifier composition.

30. The composition of claim 29 wherein said aqueous solution is a brine.

31. The composition of claim 30 wherein
said demulsifying amount of said demulsifier is from about 1 wt. % to about 40 wt. %;
said first solubilizing quantity of said non-ionic surfactant is from about 1 wt. % to about 10 wt. %; and
said second solubilizing quantity of said mutual organic solvent is from about 60 to about 98 wt. %.

32. The composition of claim 30 wherein
said demulsifying amount of said demulsifier is from about 2 wt. % to about 10 wt. %; and
said second solubilizing quantity of said mutual organic solvent is from about 85 to about 95 wt. %.

33. The demulsifier composition of claim 30 wherein said mutual organic solvent is selected from the group consisting of water soluble propylene glycol ethers, N,N-dimethylformamide, N,N-dimethylacetamide, 1-methyl-2-pyrrolidinone, acetone, methanol, ethanol, 1-propanol and 2-propanol.

34. The brine of claim 30 wherein said non-ionic surfactant has an HLB of from about 8 to about 15.

35. The brine of claim 30 wherein said mutual organic solvent is selected from the group consisting of ethylene glycol monobutyl ether (EGMBE) and ethylene glycol monomethyl ether (EGMME).

36. The composition of claim 29 wherein
said demulsifying amount of said demulsifier is from about 1 wt. % to about 40 wt. %;
said first solubilizing quantity of said non-ionic surfactant is from about 1 wt. % to about 10 wt. %; and
said second solubilizing quantity of said mutual organic solvent is from about 60 to about 98 wt. %.

37. The composition of claim 29 wherein
said demulsifying amount of said demulsifier is from about 2 wt. % to about 10 wt. %; and
said second solubilizing quantity of said mutual organic solvent is from about 85 to about 95 wt. %.

38. The demulsifier composition of claim 29 wherein said mutual organic solvent is selected from the group consisting of water soluble propylene glycol ethers, N,N-dimethylformamide, N,N-dimethylacetamide, 1-methyl-2-pyrrolidinone, acetone, methanol, ethanol, 1-propanol and 2-propanol.

39. The brine of claim 29 wherein said non-ionic surfactant has an HLB of from about 8 to about 15.

40. The brine of claim 29 wherein said mutual organic solvent is selected from the group consisting of ethylene glycol monobutyl ether (EGMBE) and ethylene glycol monomethyl ether (EGMME).

41. A brine comprising:
said brine, selected from the group consisting of a drilling fluid, a workover fluid, and a completion fluid, said brine comprising:
a demulsifying amount of one or more salts of alkylaryl sulfonic acid effective to perform a function selected from the group consisting of demulsifying an emulsion in said aqueous solution and preventing formation of an emulsion in said aqueous solution;
a first solubilizing quantity of a non-ionic surfactant effective to solubilize said demulsifier in said aqueous solution;
a second solubilizing quantity of a mutual organic solvent selected from the group consisting of water soluble glycol ethers, water soluble amides, water soluble ketones, and water soluble alcohols selected from the group consisting of methanol, ethanol, 1-propanol, and 2-propanol, said mutual organic solvent being effective to solubilize said demulsifier and said non-ionic surfactant to produce said brine.

42. The brine of claim 41 wherein said non-ionic surfactant comprises an alkoxylated compound having the following general formula:

$$R^6O(CH_2CHR^7O)_xR^8$$

wherein
$R^6$ is an alkyl group having from about 8 to about 16 carbon atoms;
$R^7$ independently is selected from the group consisting of hydrogen and alkyl groups having from about 1 to about 6 carbon atoms;
$R^8$ is selected from the group consisting of hydrogen and alkyl groups having from about 1 to about 6 carbon atoms;
x is from about 2 to about 20.

43. The brine of claim 42 wherein said non-ionic surfactant has an HLB of from about 8 to about 15.

44. The brine of claim 43 wherein said mutual organic solvent is selected from the group consisting of water soluble propylene glycol ethers, N,N-dimethylformamide, N,N-dimethylacetamide, 1-methyl-2-pyrrolidinone, acetone, methanol, ethanol, 1-propanol and 2-propanol.

45. The brine of claim 44 wherein said demulsifier comprises an amine salt of said alkylaryl sulfonic acid.

46. The brine of claim 42 wherein said mutual organic solvent is selected from the group consisting of water soluble propylene glycol ethers, N,N-dimethylformamide, N,N-dimethylacetamide, 1-methyl-2-pyrrolidinone, acetone, methanol, ethanol, 1-propanol and 2-propanol.

47. The brine of claim 42 wherein said demulsifier comprises an amine salt of said alkylaryl sulfonic acid.

48. The brine of claim 42 wherein said mutual organic solvent comprises one or more water soluble alkanol ethers having the formula $$R^{10}O(CH_2CHR^{11}O)_zR^{12}$$

wherein
$R^{10}$, $R^{11}$ and $R^{12}$ independently are selected from the group consisting of hydrogen and alkyl groups having from about 1 to about 6 carbon atoms; and
z is from about 1 to about 22.

49. The brine of claim 41 wherein said non-ionic surfactant has an HLB of from about 8 to about 15.

50. The brine of claim 49 wherein said mutual organic solvent is selected from the group consisting of water soluble propylene glycol ethers, N,N-dimethylformamide, N,N-dimethylacetamide, 1-methyl-2-pyrrolidinone, acetone, methanol, ethanol, 1-propanol and 2-propanol.

51. The brine of claim 50 wherein said non-ionic surfactant is selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation.

52. The brine of claim 51 wherein said demulsifier comprises an amine salt of said alkylaryl sulfonic acid.

53. The brine of claim 50 wherein said demulsifier comprises an amine salt of said alkylaryl sulfonic acid.

54. The brine of claim 49 wherein said non-ionic surfactant is selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation.

55. The brine of claim 49 wherein said mutual organic solvent is selected from the group consisting of ethylene glycol monobutyl ether (EGMBE) and ethylene glycol monomethyl ether (EGMME).

56. The brine of claim 41 wherein said mutual organic solvent is selected from the group consisting of water soluble propylene glycol ethers, N,N-dimethylformamide, N,N-dimethylacetamide, 1-methyl-2-pyrrolidinone, acetone, methanol, ethanol, 1-propanol and 2-propanol.

57. The brine of claim 56 wherein said non-ionic surfactant is selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation.

58. The brine of claim 41 wherein said non-ionic surfactant is selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation.

59. The brine of claim 58 wherein said demulsifier comprises an amine salt of said alkylaryl sulfonic acid.

60. The brine of claim 59 wherein said mutual organic solvent is selected from the group consisting of ethylene glycol monobutyl ether (EGMBE) and ethylene glycol monomethyl ether (EGMME).

61. The brine of claim 58 wherein said mutual organic solvent comprises one or more water soluble alkanol ethers having the formula

wherein
$R^{10}$, $R^{11}$ and $R^{12}$ independently are selected from the group consisting of hydrogen and alkyl groups having from about 1 to about 6 carbon atoms; and
z is from about 1 to about 22.

62. The brine of claim 41 wherein said demulsifier comprises an amine salt of said alkylaryl sulfonic acid.

63. The brine of claim 41 wherein said non-ionic surfactant comprises an alkoxylated compound having a hydrophilic-lipophilic balance (HLB) value of from about 5 to about 20 and having the following general formula:

wherein
$R^6$ independently is selected from the group consisting of hydrogen, acyl groups and alkyl groups having from about 1 to about 22 carbon atoms, said acyl groups having the following general formula:

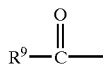

wherein $R^9$ is an alkyl group having from about 1 to about 24 carbon atoms;
$R^7$ independently is selected from the group consisting of hydrogen and alkyl groups having from about 1 to about 6 carbon atoms;
$R^8$ is selected from the group consisting of hydrogen and alkyl groups having from about 1 to about 6 carbon atoms; and
x is from about 1 to about 20.

64. The brine of claim 41 wherein said mutual organic solvent comprises one or more water soluble alkanol ethers having the formula

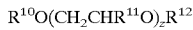

wherein
$R^{10}$, $R^{11}$ and $R^{12}$ independently are selected from the group consisting of hydrogen and alkyl groups having from about 1 to about 6 carbon atoms; and
z is from about 1 to about 22.

65. The brine of claim 41 wherein said mutual organic solvent is selected from the group consisting of ethylene glycol monobutyl ether (EGMBE) and ethylene glycol monomethyl ether (EGMME).

66. The brine of claim 50 wherein said non-ionic surfactant comprises an alkoxylated compound having a hydrophilic-lipophilic balance (HLB) value of from about 5 to about 20 and having the following general formula:

wherein
$R^6$ independently is selected from the group consisting of hydrogen, acyl groups and alkyl groups having from about 1 to about 22 carbon atoms, said acyl groups having the following general formula:

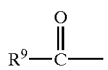

wherein $R^9$ is an alkyl group having from about 1 to about 24 carbon atoms;
$R^7$ independently is selected from the group consisting of hydrogen and alkyl groups having from about 1 to about 6 carbon atoms;
$R^8$ is selected from the group consisting of hydrogen and alkyl groups having from about 1 to about 6 carbon atoms; and
x is from about 1 to about 20.

67. A demulsifier composition consisting essentially of:
a demulsifying amount of an amine salt of alkylaryl sulfonic acid effective to perform a function selected from the group consisting of demulsifying an emulsion in an aqueous solution and preventing formation of an emulsion in an aqueous solution;
a first solubilizing quantity of a non-ionic surfactant effective to solubilize said demulsifier in said aqueous solution, said non-ionic surfactant consisting essentially of an alkoxylated compound having the following general formula:

wherein
$R^6$ is an alkyl group having from about 8 to about 16 carbon atoms;
$R^7$ independently is selected from the group consisting of hydrogen and alkyl groups having from about 1 to about 6 carbon atom;
$R^8$ is selected from the group consisting of hydrogen and alkyl groups having from about 1 to about 6 carbon atoms;
x is from about 2 to about 20; and
a second solubilizing quantity of a mutual organic solvent consisting essentially of one or more water-soluble alkanol ethers having the formula

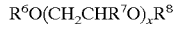

wherein
$R^{10}$, $R^{11}$ and $R^{12}$ independently are selected from the group consisting of hydrogen and alkyl groups having from about 1 to about 6 carbon atoms; and
z is from about 1 to about 22.

68. A demulsifier composition to prevent or resolve downhole emulsions in aqueous solutions, said demulsifier composition consisting essentially of:
a demulsifying amount of an amine salt of said alkylaryl sulfonic acid, effective to perform a function selected from the group consisting of demulsifying an emulsion in an aqueous solution and preventing formation of an emulsion in an aqueous solution;

a first solubilizing quantity of a non-ionic surfactant selected from the group consisting of polyoxyalcohols, tall oil ethoxyethylated having from about 6 to about 15 moles of ethylene oxide, ethoxylated nonylphenols, and phosphated fatty alcohol ethoxylates having from about 2 to about 10 moles of ethoxylation; and a second solubilizing quantity of a mutual organic solvent selected from the group consisting of water soluble glycol ethers, water soluble amides, water soluble ketones, and water soluble alcohols selected from the group consisting of methanol, ethanol, 1-propanol, and 2-propanol, said mutual organic solvent being effective to solubilize said demulsifier and said non-ionic surfactant to produce said demulsifier composition.

69. The brine of claim 68 wherein said mutual organic solvent is selected from the group consisting of ethylene glycol monobutyl ether (EGMBE) and ethylene glycol monomethyl ether (EGMME).

70. A demulsifier composition to prevent or resolve downhole emulsions in aqueous solutions, said demulsifier composition consisting essentially of:

a demulsifying amount of an amine salt of said alkylaryl sulfonic acid, effective to perform a function selected from the group consisting of demulsifying an emulsion in an aqueous solution and preventing formation of an emulsion in an aqueous solution;

a first solubilizing quantity of a non-ionic surfactant selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation; and a second solubilizing quantity of a mutual organic solvent selected from the group consisting of water soluble propylene glycol ethers, N,N-dimethylformamide, N,N-dimethylacetamide, 1-methyl-2-pyrrolidinone, acetone, methanol, ethanol, 1-propanol and 2-propanol, said mutual organic solvent being effective to solubilize said demulsifier and said non-ionic surfactant to produce said demulsifier composition.

71. A demulsifier composition to prevent or resolve downhole emulsions in a brine, said demulsifier composition consisting essentially of:

a demulsifying amount of an amine salt of said alkylaryl sulfonic acid, effective to perform a function selected from the group consisting of demulsifying an emulsion in a brine and preventing formation of an emulsion in a brine;

a first solubilizing quantity of a non-ionic surfactant selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation; and a second solubilizing quantity of a mutual organic solvent selected from the group consisting of water soluble glycol others; water soluble amides, water soluble ketones, and water soluble alcohols selected from the group consisting of methanol; ethanol, 1-propanol, and 2-propanol, said mutual organic solvent being effective to solubilize said demulsifier and said non-ionic surfactant to produce said demulsifier composition.

72. The brine of claim 71 wherein said mutual organic solvent is selected from the group consisting of ethylene glycol monobutyl ether (EGMBE) and ethylene glycol monomethyl ether (EGMME).

73. A demulsifier composition to prevent or resolve downhole emulsions in brines, said demulsifier composition consisting essentially of:

a demulsifying amount of an amine salt of said alkylaryl sulfonic acid, effective to perform a function selected from the group consisting of demulsifying an emulsion in a brine and preventing formation of an emulsion in a brine;

a first solubilizing quantity of a non-ionic surfactant selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation; and a second solubilizing quantity of a mutual organic solvent selected from the group consisting of water soluble propylene glycol ethers, N,N-dimethylformamide, N,N-dimethylacetamide, 1-methyl-2-pyrrolidinone, acetone, methanol, ethanol, 1-propanol and 2-propanol, said mutual organic solvent being effective to solubilize said demulsifier and said non-ionic surfactant to produce said demulsifier composition.

74. A demulsifier composition to prevent or resolve downhole emulsions in aqueous solutions, said demulsifier composition consisting essentially of:

a demulsifying amount of one or more salts of alkylaryl sulfonic acid, effective to perform a function selected from the group consisting of demulsifying an emulsion in an aqueous solution and preventing formation of an emulsion in an aqueous solution;

a first solubilizing quantity of a non-ionic surfactant selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation; and a second solubilizing quantity of a mutual organic solvent consisting essentially of one or more water soluble alkanol ethers having the formula

$$R^{10}O(CH_2CHR^{11}O)_zR^{12}$$

wherein $R^{10}$, $R^{11}$ and $R^{12}$ independently are selected from the group consisting of hydrogen and alkyl groups having from about 1 to about 6 carbon atoms; and z is from about 1 to about 22, said mutual organic solvent being effective to solubilize said demulsifier and said non-ionic surfactant to produce said demulsifier composition.

75. A demulsifier composition to prevent or resolve downhole emulsions in brines, said demulsifier composition consisting essentially of:

a demulsifying amount of one or more salts of alkylaryl sulfonic acid, effective to perform a function selected from the group consisting of demulsifying an emulsion in a brine and preventing formation of an emulsion in a brine;

a first solubilizing quantity of a non-ionic surfactant selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation; and a second solubilizing quantity of a mutual organic solvent consisting essentially of one or more water soluble alkanol ethers having the formula $$R^{10}O(CH_2CHR^{11}O)_zR^{12}$$

wherein
$R^{10}$, $R^{11}$ and $R^{12}$ independently are selected from the group consisting of hydrogen and alkyl coups having from about 1 to about 6 carbon atoms; and z is from about 1 to about 22, said mutual organic solvent being effective to solubilize said demulsifier and said non-ionic surfactant to produce said demulsifier composition.

76. A demulsifier composition to prevent or resolve downhole emulsions in aqueous solutions, said demulsifier composition consisting essentially of:

a demulsifying amount of an amine salt of said alkylaryl sulfonic acid, effective to perform a function selected from the group consisting of demulsifying an emulsion in an aqueous solution and preventing formation of an emulsion in an aqueous solution;

a first solubilizing quantity of a non-ionic surfactant selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation; and a second solubilizing quantity of a mutual organic solvent consisting essentially of one or more water soluble alkanol ethers having the formula $$R^{10}O(CH_2CHR^{11}O)_zR^{12}$$

wherein
$R^{10}$, $R^{11}$ and $R^{12}$ independently are selected from the group consisting of hydrogen and alkyl groups having from about 1 to about 6 carbon atoms; and z is from about 1 to about 22, said mutual organic solvent being effective to solubilize said demulsifier and said non-ionic surfactant to produce said demulsifier composition.

77. A demulsifier composition to prevent or resolve downhole emulsions in a brine, said demulsifier composition consisting essentially of:

a demulsifying amount of an amine salt of said alkylaryl sulfonic acid, effective to perform a function selected from the group consisting of demulsifying an emulsion in a brine and preventing formation of an emulsion in a brine;

a first solubilizing quantity of a non-ionic surfactant selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation; and a second solubilizing quantity of a mutual organic solvent consisting essentially of one or more water soluble alkanol ethers having the formula $$R^{10}O(CH_2CHR^{11}O)_zR^{12}$$

wherein
$R^{10}$, $R^{11}$ and $R^{12}$ independently are selected from the group consisting of hydrogen and alkyl groups having from about 1 to about 6 carbon atoms; and z is from about 1 to about 22, said mutual organic solvent being effective to solubilize said demulsifier and said non-ionic surfactant to produce said demulsifier.

78. A demulsifier composition to prevent or resolve downhole emulsions in brines, said demulsifier composition consisting essentially of:

a demulsifying amount of an amine salt of said alkylaryl sulfonic acid, effective to perform a function selected from the group consisting of demulsifying an emulsion in a brine and preventing formation of an emulsion in a brine;

a first solubilizing quantity of a non-ionic surfactant selected from the group consisting of polyoxyalcohols, tall oil ethoxyethylate having from about 6 to about 15 moles of ethylene oxide, ethoxylated nonylphenols, and phosphated fatty alcohol ethoxylates having from about 2 to about 10 moles of ethoxylation; and a second solubilizing quantity of a mutual organic solvent consisting essentially of one or more water soluble alkanol ethers having the formula $$R^{10}O(CH_2CHR^{11}O)_zR^{12}$$

wherein
$R^{10}$, $R^{11}$ and $R^{12}$ independently are selected from the group consisting of hydrogen and alkyl groups having from about 1 to about 6 carbon atoms; and z is from about 1 to about 22, said mutual organic solvent being effective to solubilize said demulsifier and said non-ionic surfactant to produce said demulsifier composition.

* * * * *

UNITED STATES PATENT AND TRADEMARK OFFICE
CERTIFICATE OF CORRECTION

PATENT NO. : 6,914,036 B2
DATED : July 5, 2005
INVENTOR(S) : William A. Spalding It is certified that error appears in the above-identified patent and that said Letters Patent is hereby corrected as shown below:

Column 11,
Line 51, delete "baying" and insert -- having --.

Column 12,
Line 4, delete "at" and insert -- of --.

Column 14,
Line 15, delete "fist" and insert -- first --.
Line 36, delete "hiving" and insert -- having --.

Column 18,
Line 53, delete "$R^6O(CH_2CHR^7O)_xR^8$" and insert -- $R^{10}O(CH_2CHR^{11}O)_zR^{12}$ --.
Line 58, delete "others;" and insert -- ethers, --.
Line 60, delete "methanol;" and insert -- methanol, --.

Signed and Sealed this

Thirteenth Day of September, 2005

JON W. DUDAS
*Director of the United States Patent and Trademark Office*